United States Patent
Berezowski et al.

(10) Patent No.: US 7,218,708 B2
(45) Date of Patent: May 15, 2007

(54) INTERNET FACILITATED EMERGENCY AND GENERAL PAGING SYSTEM

(75) Inventors: Andrew G. Berezowski, Wallingford, CT (US); Patrick J. Garvy, Wallingford, CT (US); George P. Mancini, Wallingford, CT (US); Charles T. Pearson, Northford, CT (US); Todd W. Warner, Concord, NC (US)

(73) Assignee: Honeywell International, Inc., Morristown, NJ (US)

( * ) Notice: Subject to any disclaimer, the term of this patent is extended or adjusted under 35 U.S.C. 154(b) by 64 days.

(21) Appl. No.: 10/800,218

(22) Filed: Mar. 12, 2004

(65) Prior Publication Data

US 2005/0201541 A1  Sep. 15, 2005

(51) Int. Cl.
*H04M 11/04* (2006.01)
*H04M 1/60* (2006.01)
*H04M 9/00* (2006.01)

(52) U.S. Cl. .................. 379/37; 379/41; 379/170; 379/171

(58) Field of Classification Search ............ 379/37, 379/41, 43, 44, 47, 48, 50, 51, 159, 160, 379/170, 171, 172; 370/352, 356; 340/500, 340/506, 825.36, 7.1–7.62
See application file for complete search history.

(56) References Cited

U.S. PATENT DOCUMENTS

| | | | | |
|---|---|---|---|---|
| 3,848,193 A | * | 11/1974 | Martin et al. | 455/526 |
| 5,740,235 A | * | 4/1998 | Lester et al. | 340/7.27 |
| 5,781,852 A | * | 7/1998 | Gropper | 455/227 |
| 5,887,067 A | * | 3/1999 | Costa et al. | 381/81 |
| 6,078,653 A | * | 6/2000 | Jean-Claude et al. | 379/167.01 |
| 6,108,544 A | * | 8/2000 | Dorenbosch et al. | 340/7.27 |
| 6,295,001 B1 | * | 9/2001 | Barber | 340/601 |
| 6,442,250 B1 | * | 8/2002 | Troen-Krasnow et al. | 379/93.15 |
| 6,553,100 B1 | * | 4/2003 | Chen et al. | 379/37 |
| 6,574,338 B1 | * | 6/2003 | Sachdev | 380/212 |
| 6,650,744 B1 | * | 11/2003 | Hamzeh et al. | 379/170 |
| 6,745,021 B1 | * | 6/2004 | Stevens | 455/404.1 |
| 2004/0170159 A1 | * | 9/2004 | Kim et al. | 370/352 |
| 2004/0203568 A1 | * | 10/2004 | Kirtland | 455/404.1 |

* cited by examiner

*Primary Examiner*—Quoc Tran
(74) *Attorney, Agent, or Firm*—Welsh & Katz, Ltd.

(57) ABSTRACT

A plurality of displaced paging systems can be controlled from a common paging facility via a computer network such as the Internet. Real-time streaming audio can be transmitted, via the network to one or more identified facilities and/or zones and broadcast thereinto.

12 Claims, 10 Drawing Sheets

INTERNET FACILITATED EMERGENCY AND GENERAL PAGING SYSTEM

FIELD OF THE INVENTION

The invention pertains to paging systems. More particularly, the invention pertains to systems for remote control of displaced paging systems through computer networks.

BACKGROUND OF THE INVENTION

Building or regional paging systems are known and are often installed throughout buildings, sometimes alone and sometimes in combination with monitoring systems such as fire control systems. Known paging systems provide facilities whereby an operator can select one or more regions, zones, offices, cubicles or the like in a building to transmit audio thereto. Some known paging systems also provide a voice answer back capability.

Where paging systems are associated with or integrated with fire alarm control systems, they can be used to inform individuals in various regions of a building or installation as to the nature and circumstances of emergency conditions. They can also be used to provide instructions as to evacuation or non-evacuation in the event of fire or other types of emergencies.

Known systems can be effective to provide local audio to selectable zones of one or more buildings. However, it may not always be possible to provide either the local personnel, who would normally be expected to operate the respective system or to provide the emergency information to such people for local broadcast. There is thus an ongoing need to be able to remotely access one or more paging systems, perhaps simultaneously, to be able to broadcast audio, in real time, from one or more common control units to remote zones via locally installed paging systems. It would be preferable if such communications could be implemented without having to install an additional communications system between the remote paging control center or centers and the destination of regional paging systems.

As illustrated in FIG. 1, a known paging system 10 includes a local control unit or panel 12 which might be coupled to, or integrated with, the building fire alarm control system 14. The paging control system 12 is coupled via cables or wirelessly to a plurality of output transducers, such as speakers 16a . . . 16n in zone Z1, 18a . . . 18m in zone Z2 and so on. An operator can use an audio input transducer, a microphone or telephone 12-1, to transmit audio locally via the paging control system 12 throughout one or more of the zones Z1 . . . Zn or, if desired to only a portion of a zone or zones using selected output devices such as 16a or 18a.

The system 10 can be used by first responders such as fire or emergency personnel to communicate with individuals throughout the building or facility on a real time basis in the event of emergency conditions.

DETAILED DESCRIPTION OF THE EMBODIMENTS

Figure 1:
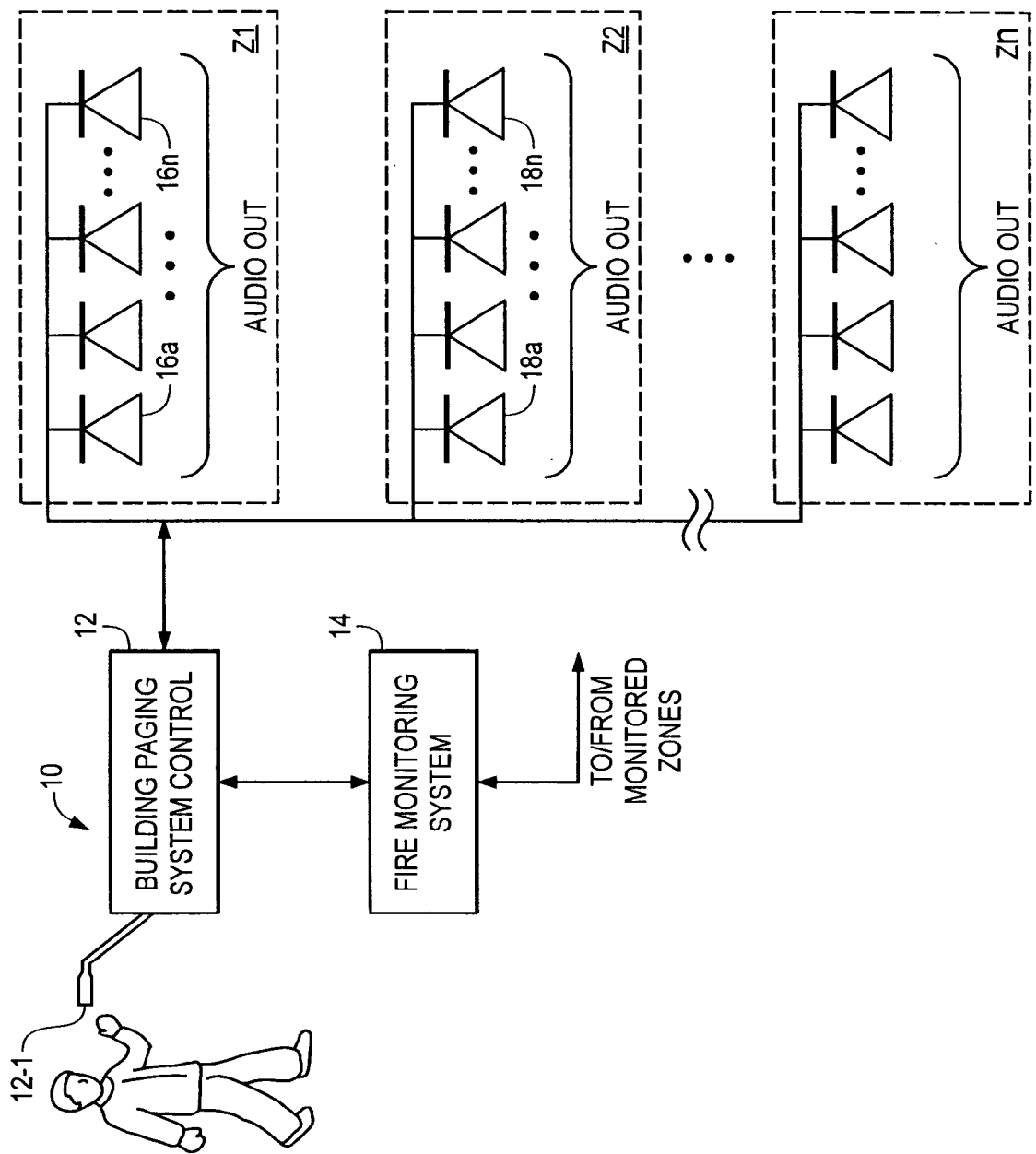
FIG. 1 is a block diagram of a known paging system.

While embodiments of this invention can take many different forms, specific embodiments thereof are shown in the drawings and will be described herein in detail with the understanding that the present disclosure is to be considered as an exemplification of the principles of the invention and is not intended to limit the invention to the specific embodiment illustrated.

Organizations such as businesses or governments can notify building or facility occupants at various locations by communicating real-time streaming audio via a computer network, such as the Internet, or alternately in some circumstances, an intranet, to be presented, also in real-time, via a facility paging system to one or more audio output devices, such as speakers in one or more zones. When necessary, the messages can be transmitted to a plurality of facilities simultaneously through a plurality of independent paging systems. Further, messages can be prioritized so that emergency messages are presented with the highest speed and highest priority.

In one aspect, the Internet and voice-over-IP processing transfers real-time audio, voice, and instructions from a common control terminal or paging interface to a plurality of zones in specified remote facilities. The facilities can be located worldwide.

The voice-over IP processing can be combined with a data encryption protocol to provide secure real-time voice transmission and messages. Decryption can take place in real-time at the destination or destinations.

Circuitry and software provided at a source location accept and process real-time audio, voice messages, for transmission over the Internet, or intranet. An operator at the source or paging interface can use an audio transducer such as a microphone or telephone to forward the real-time messages to the remote locations and selected zones therein. The voice is converted to a digital representation and sent as digital data over a packet network, such as the Internet or an intranet.

The paging or source terminal through a graphical user interface can identify available facilities and zones therein for selection by an operator. Once selected, the audio message from the operator can be transmitted and presented substantially in real-time at the various remote facilities worldwide by activation and deactivation of the appropriate speaker zones specified by the operator.

Each destination can be assigned an IP address for purposes of carrying out the Internet or intranet communication process. The paging or source interface includes software and circuitry to transfer not only the digitized voice, but voice destination information, such as facilities and zones therein to multiple IP addresses simultaneously via the Internet. Messages can be transferred using known TCP/IP or UDP protocols. If desired, transmissions to multiple destinations can be effected by multicasting or point-to-point fan out of messages.

The voice can be processed using compression techniques and methods before transmission if desired. Authentication software can be provided at the source, paging, interface to confirm that that particular interface is authorized to transmit to the selected facility or specified regions.

At the destinations, communication software is available for receiving messages from the network, and to, if desired, authenticate incoming voice and control data from the source. Decryption and decompression software can also be provided for the digitized voice. Destination software also provides for the transfer of output or speaker zone commands to the paging system to activate the appropriate speakers. The software also converts the packets of digital voice to audio and forwards it to the activated speaker zones of the paging system.

The destination or gateway software can select among prioritized received messages and present the highest priority messages first. If desired, the destination software can provide confirmation or denial of message delivery to the selected paging zones back to the initiating paging or source interface. The paging, or source, interface can also incorporate software and circuitry to monitor the integrity of the destinations by receiving periodic return data therefrom confirming delivery of messages as well as providing status of the respective paging system or node. The destination paging systems or nodes can also include a circuitry to monitor the integrity of the respective audio system or systems using various types of supervision circuitry. Failures of destination gateways or destination paging systems can be transmitted to the paging, or source, interface for display at the operator interface.

The paging or source interface can be authenticated based on its IP address and serial number prior to the destination gateways or paging systems accepting data therefrom. Similarly, feedback from the destinations can be authenticated by their respective IP addresses and serial numbers.

Full duplex communication can be implemented by providing a substantially identical paging interface at the destination for purposes of transmitting messages back to the source interface. If desired, the transmissions from the destination can include images from video cameras of conditions at the selected zones or regions.

Figure 2:
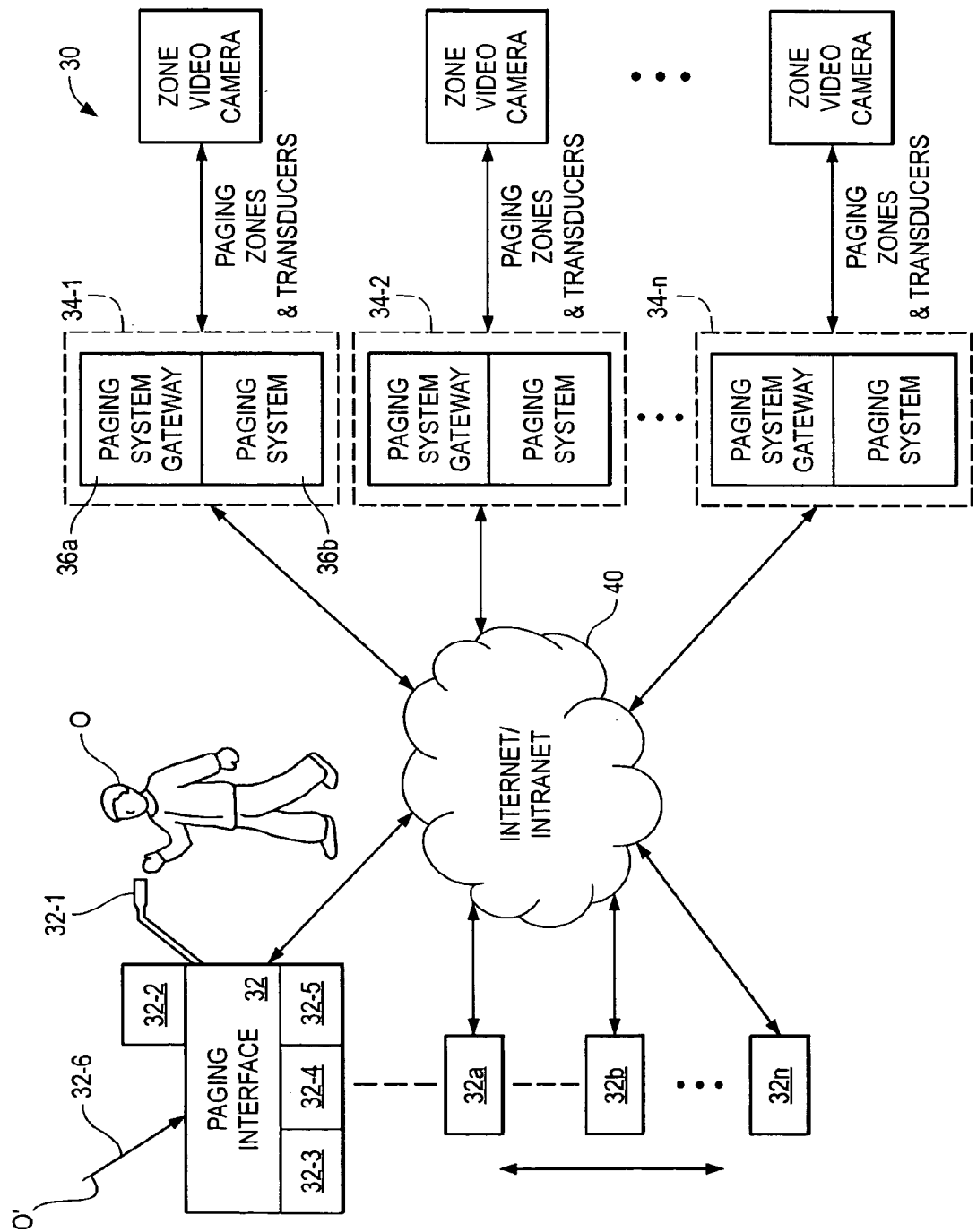
FIG. 2 is a block diagram of a remotely controllable paging systems in accordance with the present invention.

FIG. 2 illustrates a system 30 in accordance with the present invention. The system 30 incorporates at least one paging or source interface 32 and a plurality of destination units such as 34-1, 34-2 . . . 34-n. Additional paging sources 32a, b . . . n can communicate directly with each other, or, via network 40 to specify paging systems and/or zone(s) therein.

The units such as 34-1 can incorporate a paging system gateway 36a which is coupled to a local facility or a building paging system 36b. The paging system 36b will have output transducers distributed throughout the respective facility or region as well as a plurality of switching circuits as would be known to those of skill in the art for selectively activating various zones or output transducers in zones.

Paging or source interface 32 incorporates an audio input transducer such as transducer 32-1 which could be a microphone or telephone which enables an operator O to forward real-time audio messages to selected remotely located paging systems, such as system 36b. Paging interface or source 32 includes graphical user interface 32-2, which presents a plurality of interactive screens via which the operator O can select one or more facilities such as 34-1, 34-2 . . . as well as zones or regions within a selected facility to receive the real-time audio messages.

Alternate embodiments, in accordance with the invention include providing a wireless link between paging interface 32 and the Internet or intranet. A wired, via the public switched telephone network with automatic answer capabilities, or wireless radio for example or cell phone, voice link can be provided between an individual and paging interface 32 as an alternate to a local microphone such as microphone 32-1. In these embodiments received voice in combination with digital signal processing would enable the wired or wirelessly connected individual to automatically initiate paging at one or more selected remote locations. In the alternative, an operator local to paging interface 32 could specify the remote location(s) and/or zone(s) in response to instructions received by wire line, or wirelessly such as by cell phone or dedicated radio link.

Paging or source interface 32 also includes one or more programmable processors 32-3 which interact with locally stored control program(s) 32-4 and a database 32-5 of available destinations, or nodes, and zones. The control program(s) 32-4 interact with graphical user interface, and associated display(s) 32-2. Interface 32 enables operator O to select one or more remote paging systems and zone(s) therein to transmit live audio, via transducer 32-1 to the select zone(s) in real-time.

Control information and/or real-time audio to be transmitted to the paging locations could be coupled via wired or wireless link 32-6 to paging interface 32 as an alternate to local microphone 32-1. Those of skill in the art will understand that the link 32-6 could be implemented as a dedicated wired or wireless link, or a switched partly land line, partly cellular link all without limitation. This link would enable an operator O', displaced from interface 32, to control the paging destinations (perhaps with a digital signal processor at interface 32) and/or provide the real-time streaming audio to the selected location(s) and zone(s). If desired, real-time video could also be supplied thereto.

Transmission between the paging source or interface 32 and facilities 34-1, 2 . . . n is via a packet switching network such as the Internet or intranet indicated generally at 40. Those of skill will understand that the paging source or interface 32 can communicate via the network 40 and specify one or more of the facilities 34-1, -2, -n, using the respective IP address. Using a serial number an authentication function can be provided. Such forms of communication are well known and need not be expanded on further.

Figure 3:
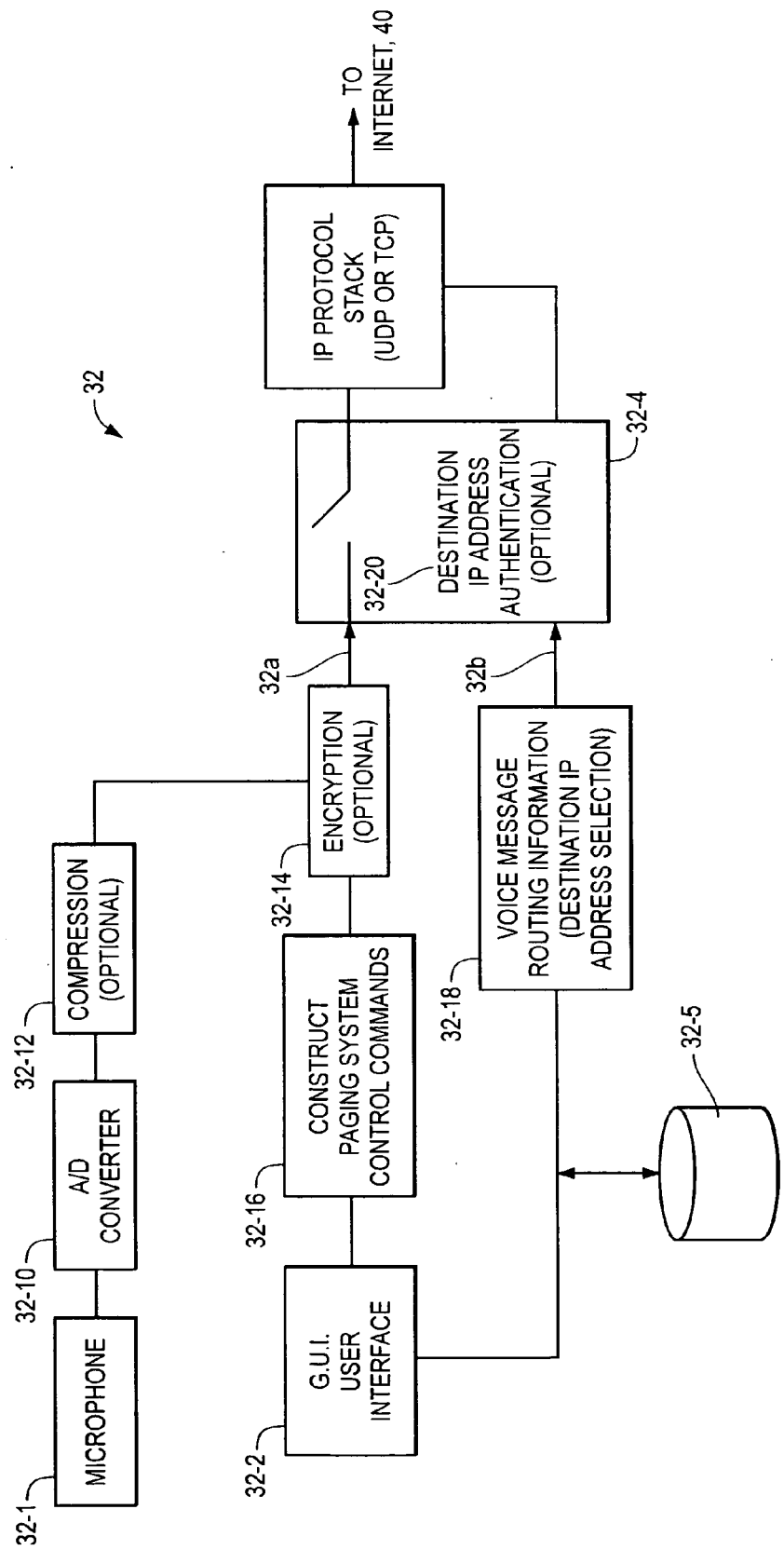
FIG. 3 is a block diagram of a representative or exemplary paging interface resource in accordance with the invention.

FIG. 3 is a block diagram illustrating details of paging interfacing or source 32. Microphone 32-1 is electrically coupled to analog-to-digital converter 32-10 whose digitized output can be optionally compressed using compression software 32-12. Compressed audio can be optionally encrypted using encryption software 32-14.

Commands from the graphical user interface 32-2 can be fed to paging system software 32-16 which can construct or format control commands for respective paging systems, such as paging system 36b. Additionally, message routing information from user interface 32-2 can be formatted by software 32-18. Control circuitry 32-4 can combine encrypted audio 32a and routing information 32b for communication via Internet 40 to the selected destination or destinations. Optional destination address authentication software 32-20 can be incorporated into control circuitry 32-4 if desired.

Figure 4:
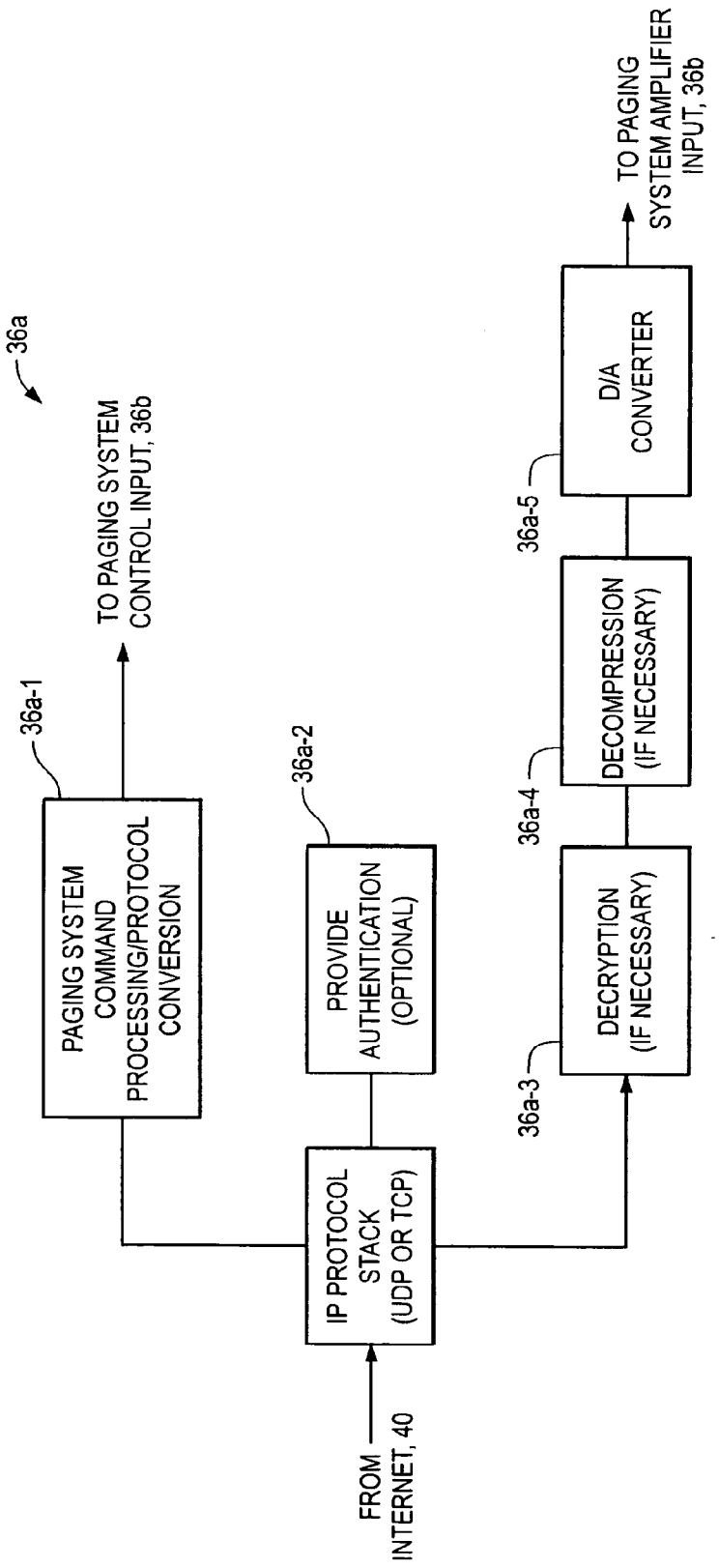
FIG. 4 is a block diagram of a representative paging system gateway or destination in accordance with the invention.

FIG. 4 is a block diagram of representative paging system gateway 36a. Gateway 36a receives audio and commands via Internet 40 from paging interface 32. Received commands can be processed and converted as necessary via software 36a-1 before being coupled to the control input for the paging system 36b. Optional authentication software 36a-2 can be provided to evaluate the authenticity of incoming data and messages from paging interface 32. Received audio can be optionally decrypted, software 36a-3 optionally decompressed, software 36a-4 and converted to audio signals by digital-to-analog converter 36a-5.

Output from digital-to-analog converter 36a-5, an audio waveform, can be coupled to one or more amplifier inputs of the respective paging system 36b. As a result of the zone establishing commands coupled from software 36a-1 to the control input of the paging system 36b, the audio amplifier or amplifiers of the respective paging system 36b will broadcast the real-time audio into the zone or zones which have been selected.

Figure 5:
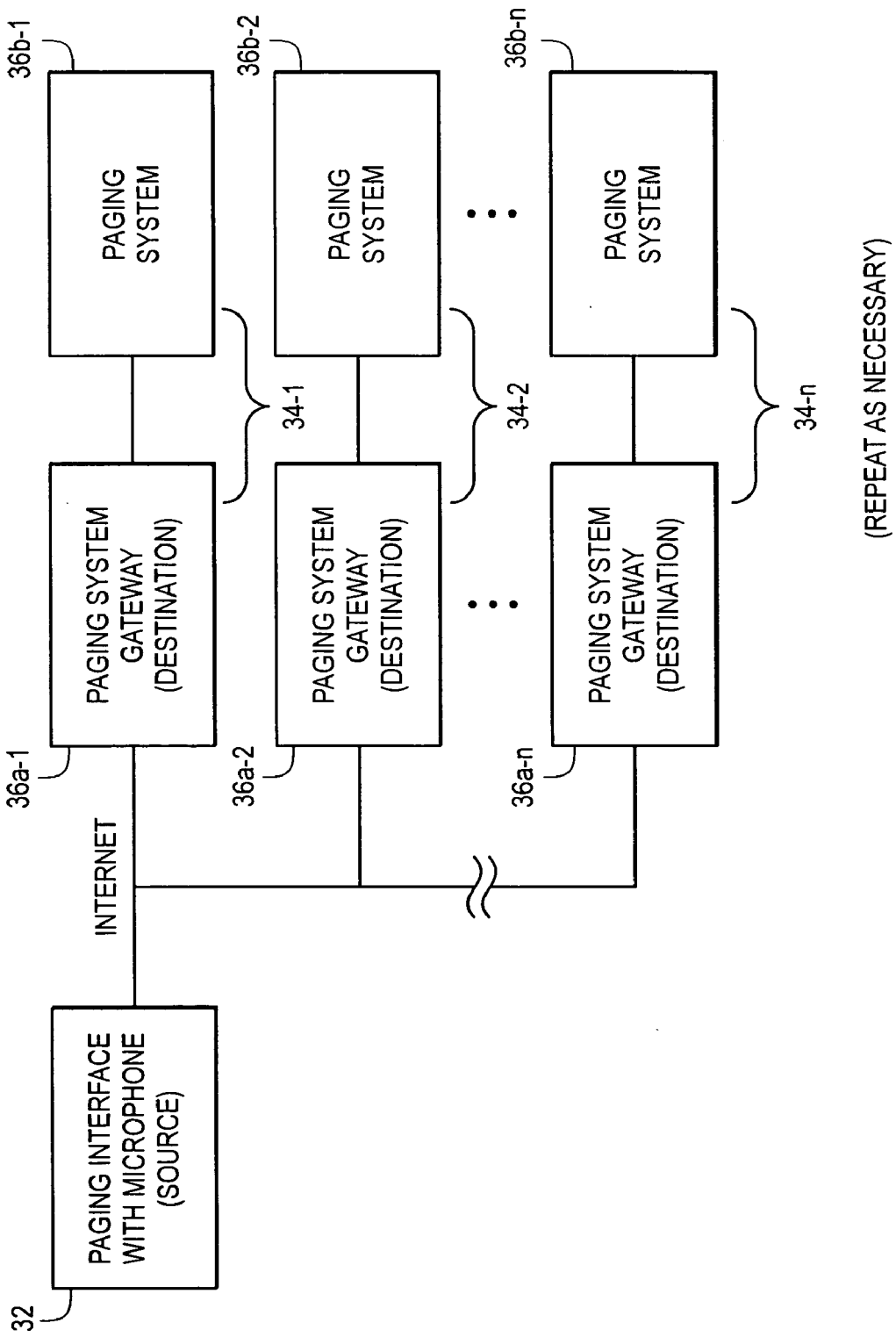
FIG. 5 illustrates a multi-facility assist in accordance with the invention.

FIG. 5 is a block diagram of a single paging interface 32 coupled to a plurality of facilities 34-1, 34-2 ... 34-n. Each of the facilities incorporates a respective paging system gateway 36a-i and paging system, such as paging system 36b-i. It will be understood that the various paging system gateways such as 36a-1, -2 ... -n may vary in their details from one another in view of differing paging systems such as 36b-1, -2 ... -n. It will be understood that all such variations come within the spirit and scope of the present invention.

Figure 6:
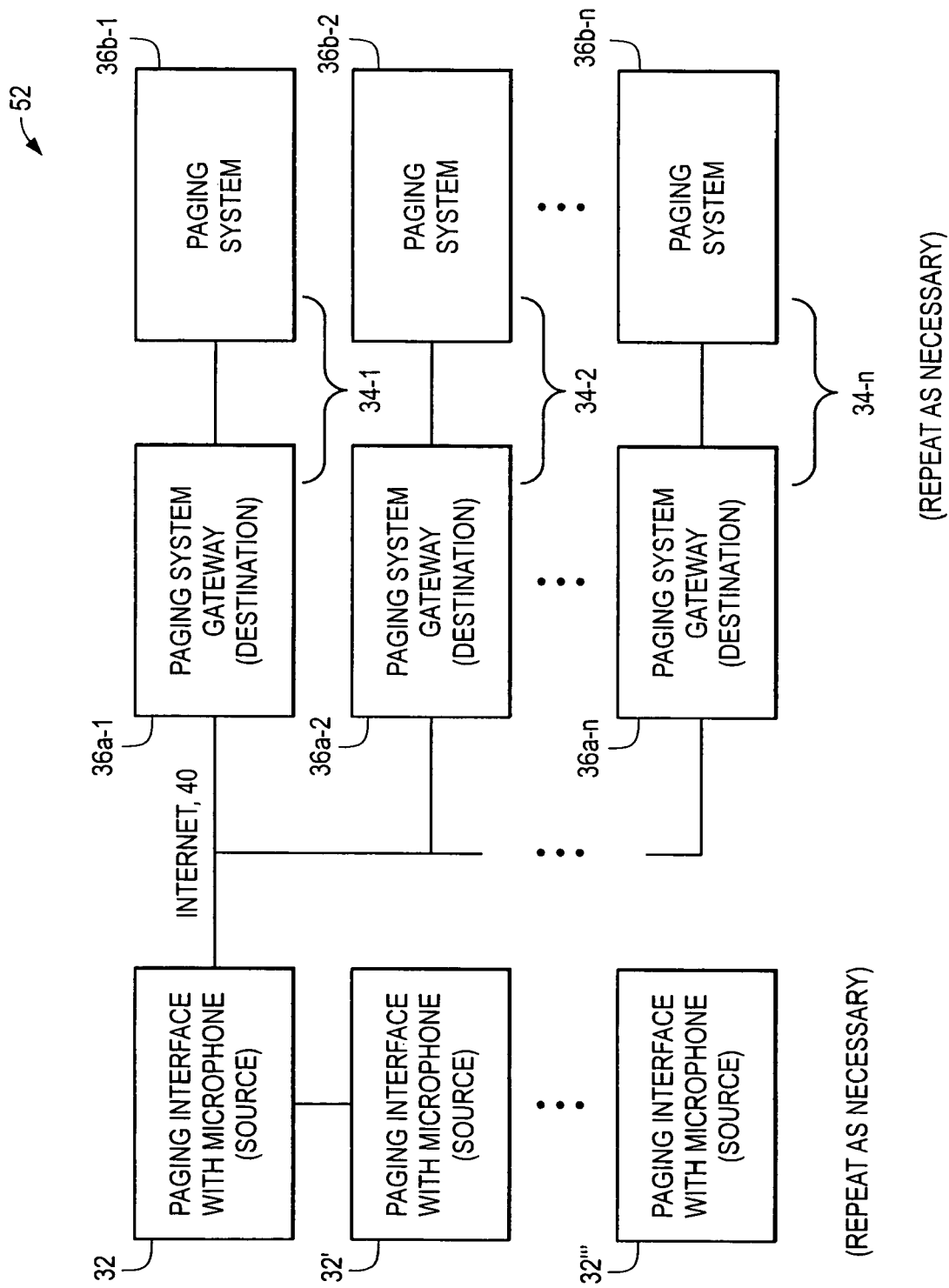
FIG. 6 is a block diagram of a multi-source and multi-facility system in accordance with the invention.

FIG. 6 is a block diagram of system 52 which incorporates a plurality of paging interfaces such as interfaces 32, 32' ... 32'''. In the system 52, a plurality of displaced paging interfaces can be provided which communicate via Internet 40 with the displaced facilities 34-1, -2 ... -n. Any of the paging interfaces can be active at one time. Receiving paging systems 36b-i will present multiple messages, if present, to a common selected zone, based on message priorities. Higher priority audio will be presented before lower priority audio.

Figure 7:
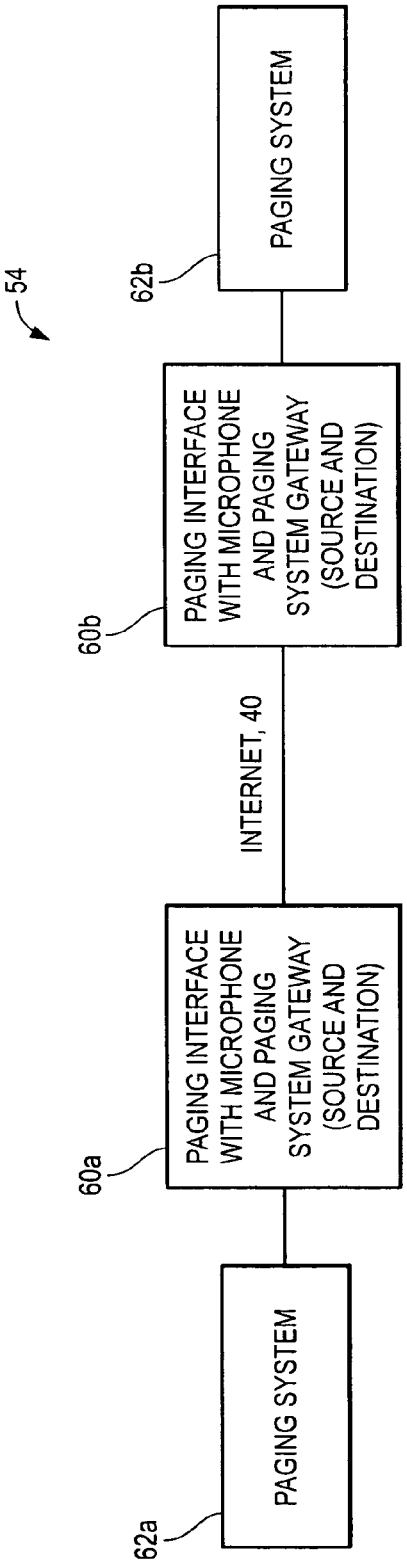
FIG. 7 is a block diagram of a system supporting full duplex communication between two different paging systems.

FIG. 7 illustrates a block diagram of system 54 which provides duplex communication via Internet 40 and includes substantially identical paging interfaces with audio input as well as paging system gateway software, with audio output 60a, b. The interfaces and gateways 60a, b in addition to being coupled via the Internet 40 for real-time bi-directional voice communication, are each in turn coupled to respective paging systems 62a, b.

Real-time audio from paging interface 60b can be coupled via Internet 40 and paging system gateway 60a to be broadcast on paging system 62a. Similarly, real-time audio can be coupled via paging interface 60a, Internet 40 and paging system gateway software 60b to be broadcast live on paging system 62b at one or more specified zones.

Figure 8:
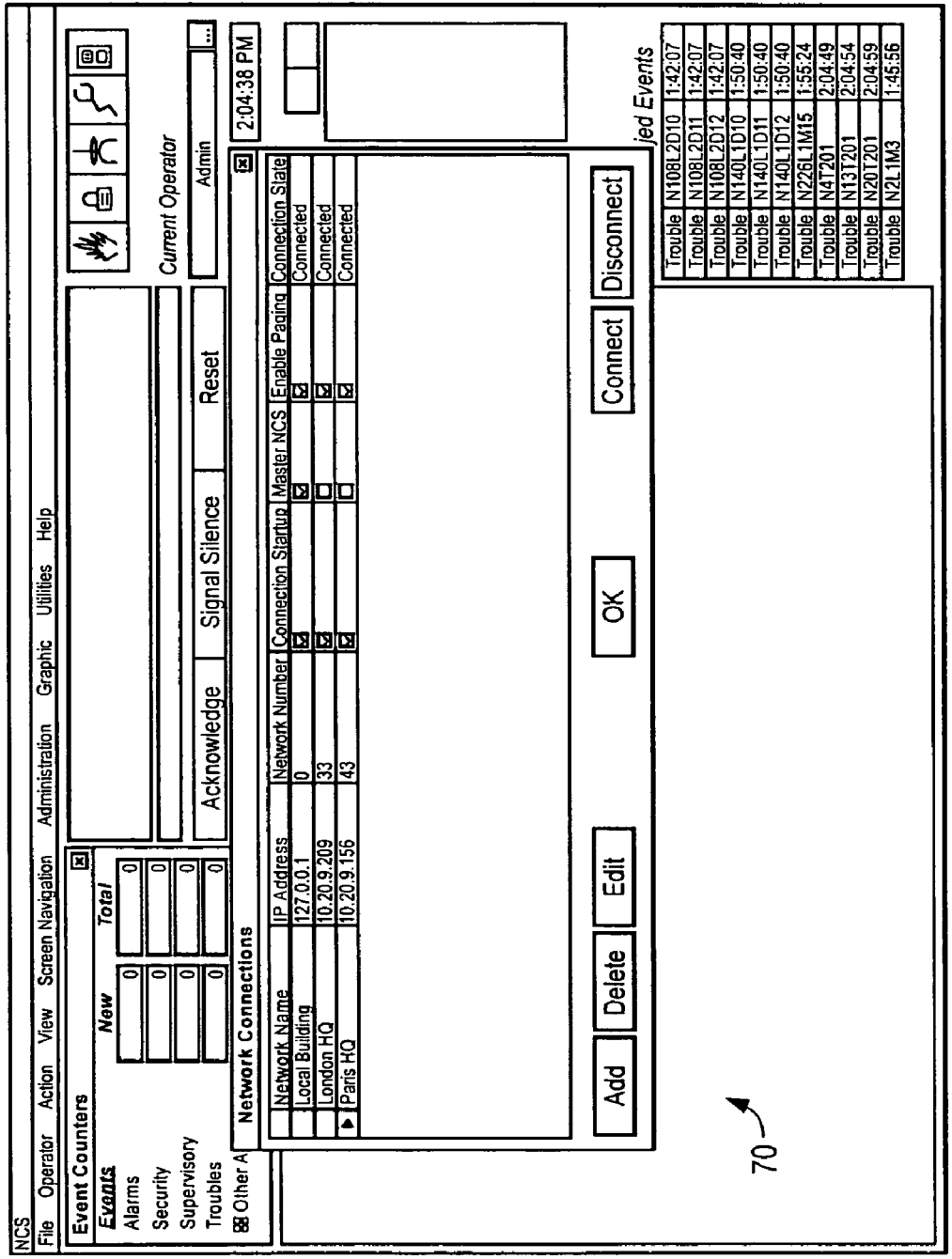
FIG. 8 is a screen enabling an operator to enter destination names and addresses.

FIG. 8 is an input screen 70 presentable by paging interface 32 via the graphical user interface 32 and associated display for the operator O. The screen 70 enables the operator to enter the IP address of one or more remote destination sites which are equipped with paging system gateway software. Such sites could correspond to the respective facilities 34-1, -2 ... -n. Operator O can also associate an alpha-numeric designation with each of the designated IP addresses.

Figure 9:
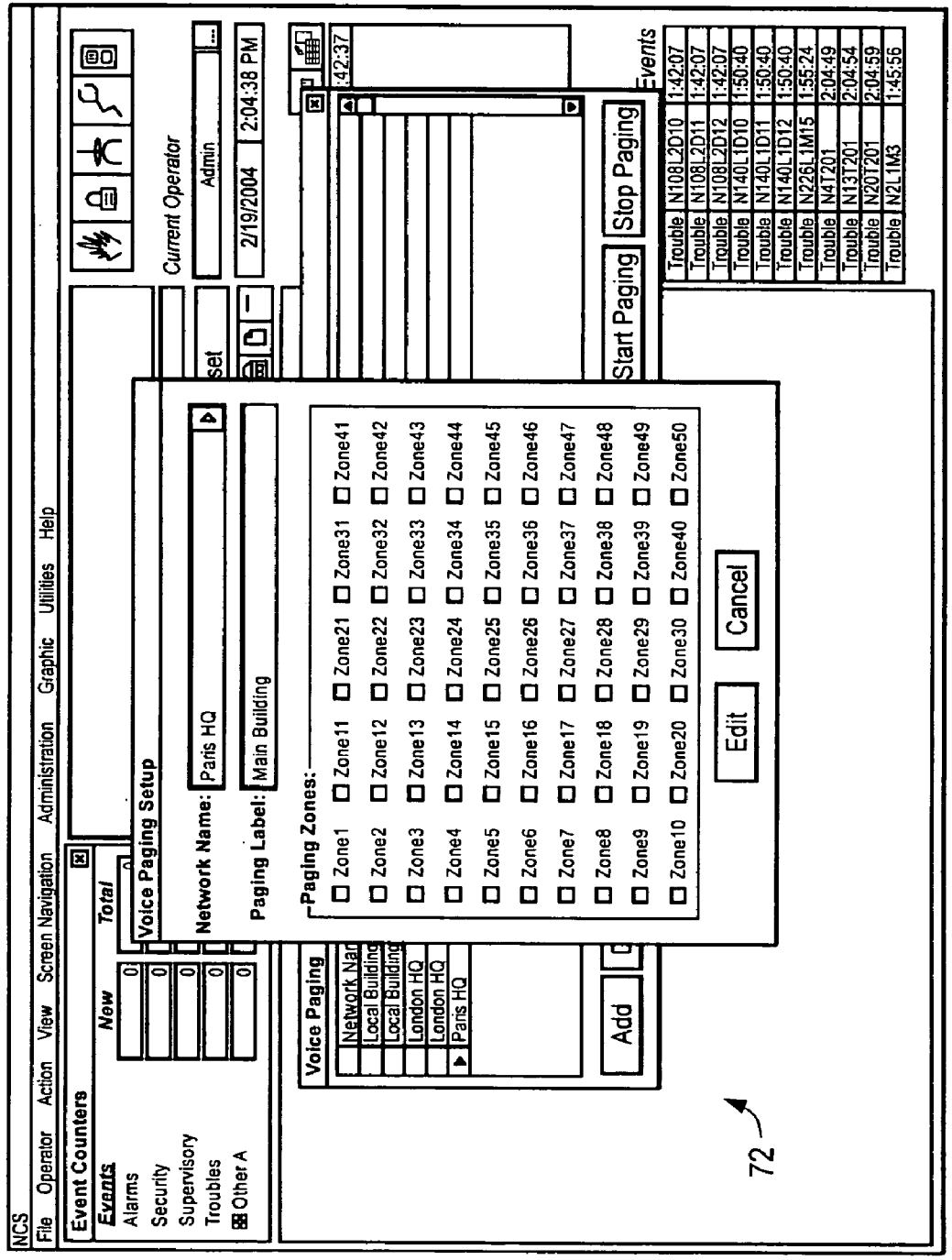
FIG. 9 is a screen enabling an operator to specify paging labels or areas within a facility by identifying a plurality of zones to be activated.

FIG. 9 is a screen 72 presented by the paging interface and graphical user interface 32-2 enabling operator O to define the various zones at each of the facilities such as 34-1, -2 ... -n, to which audio can be broadcast via the interface 32. The operator O can select from among the network names, previously entered via screen 70 for which paging has been enabled. One or more paging areas can be defined by the user O at a given facility by selecting a combination of zones, using screen 72 and providing a unique paging label therefore. When finished, the various paging areas can be stored in database 32-5 for subsequent use by operator O. Selection of a paging area will automatically activate speakers for the selected zones at the respective facility. Multiple paging areas can be defined for a respective facility.

Figure 10:
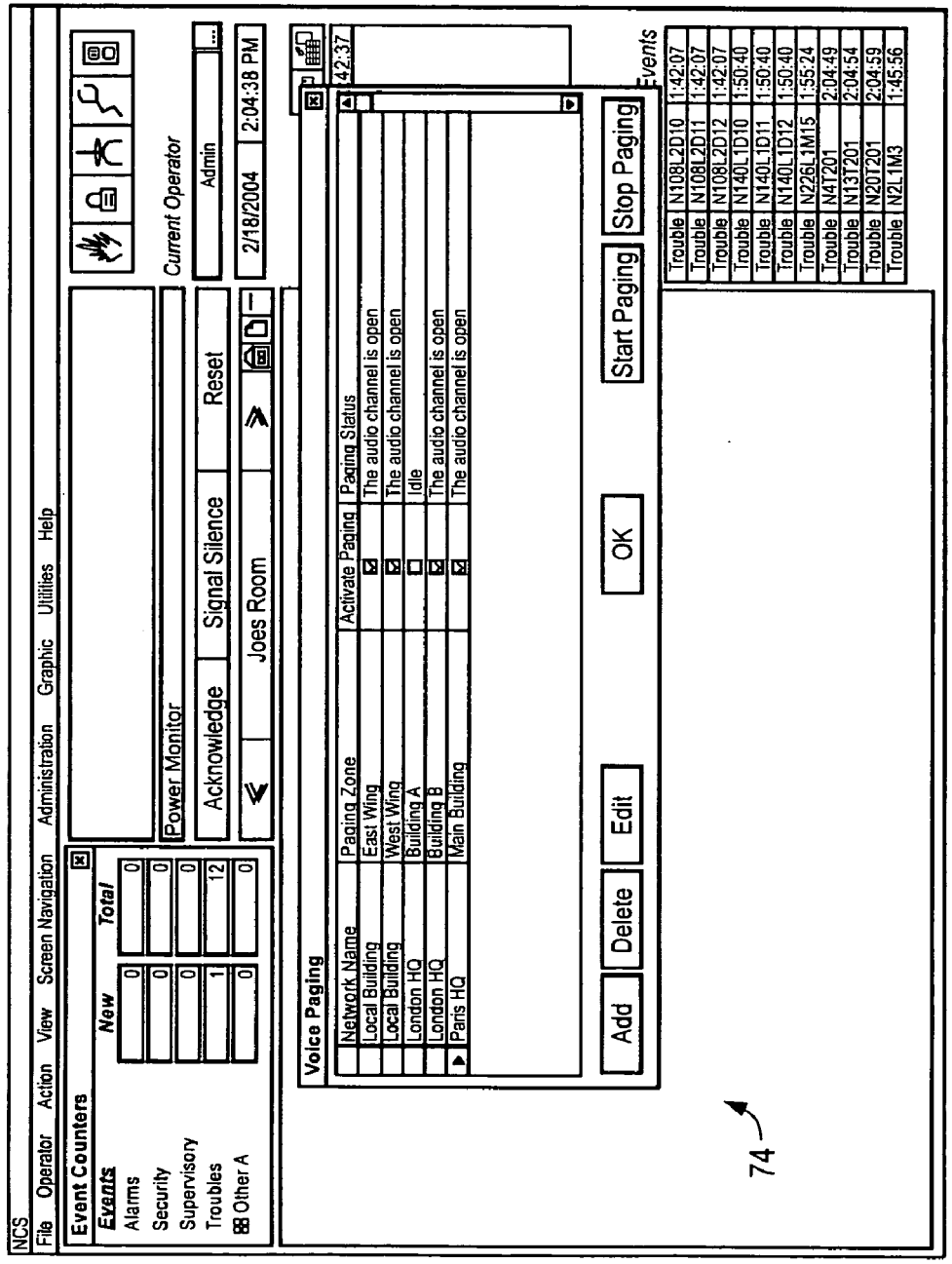
FIG. 10 is a screen enabling an operator to select one or more facilities, one more paging areas within the respective facilities into which real-time streaming audio is to be broadcast.

FIG. 10 is a screen 74 used in selecting one more facilities 34-1 ... -n and paging zones or areas therein into which a real-time message or messages are to be broadcast. Selecting one or more "Activate Paging" boxes and clicking on the "Start Paging" button will cause the authentication processes, if present, to be implemented at the source and destination to determine if the required priority level has been achieved or is present to override paging that may already be occurring. If authentication and priority checking is acceptable, the predefined paging zones or areas will be automatically activated to receive real-time audio via microphone or telephone 32-1. Clicking on the "Stop Paging" button will disable the microphone or telephone and deactivate the paging zones.

It will be understood that each of the gateways such as 36a-1 ... -n can incorporate status reporting software to report via Internet 40 to the paging interface 32 the status of the respective gateway as well as the respective paging system or systems associated therewith. Such status reporting can be implemented as various messages as well as just periodic signals indicating status is acceptable at the receiving end. The paging interface 32 can maintain a log of ongoing communications as well as selected facilities and zones for subsequent review and auditing.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A system for remote control of displaced paging systems through at least one computer network comprising:
   source software for accepting an identification of at least one facility and at least one region therein into which audio is to be broadcast via a local paging audio system installed in the facility;
   communications software for establishing communications, via a computer network, with destination software for transmitting at least a facility identifier, a region identifier, and a representation of the audio to be broadcast; and
   destination software, responsive to a received facility identifier and a received region identifier for interacting with the local paging audio system to broadcast received audio into the identified facility and region and where the local paging audio system includes a control element coupled to at least first and second pluralities of audio output transducors, each plurality is located in a respective region of the facility.

2. A system as in claim 1 where the source software includes graphical user interface software which graphically presents available facilities and regions for selection.

3. A system as in claim 2 where the source software includes audio compression software.

4. A system as in claim 2 where the source software includes encryption software.

5. A system as in claim 1 where the destination software includes status reporting software to communicate, at least intermittently, via the computer network, with the source software.

6. A system as in claim 1 where the destination software includes audio processing software to transmit local audio to the source software, via the computer network, for audible presentation local to the source software.

7. A system as in claim 1 which includes at least second destination software responsive to a received second, different facility identifier and a received second, different region identifier for interacting with a second, different local paging audio system to broadcast received audio into the second identified facility and second region.

8. A building control system for remote control of displaced paging systems through at least one computer network comprising:

at least one multi-zone paging system which includes;

a first plurality of audio output devices, the members of the plurality are displaced from one another and installed in a first zone of a building being monitored;

a second plurality of audio output devices, the members of the plurality are displaced from one another and installed in a second zone of the building;

control circuits at the building coupled to the first and second pluralities, the control circuits, in response to received commands, select at least one of the pluralities and couple prioritized verbal messages received from a displaced source thereto;

an interface to a computer network, the interface is coupled to the control circuits, the interface receives commands and verbal messages from the displaced source and forwards same to the control circuits, the control circuits couple received verbal messages to the respective plurality in accordance with an associated indicium of priority.

9. A system as in claim 8 where at least one of the zones includes a video input transducer that generates real-time video information indicative of conditions in the respective zone, the video information is coupled to the interface for transmission to the displaced source substantially in real-time.

10. A system as in claim 9 where the control circuits also couple audio signals received from a respective zone, via the interface and computer network to the displaced source substantially in real-time.

11. A system as in claim 8 comprising:

a plurality of multi-zone paging systems, each paging system including circuitry for selecting at least one of a plurality of zones, each zone including a plurality of at least audio output devices, each paging system also including an interface to the computer network for bidirectional communications of at least verbal messages with a displaced, common, source.

12. A system as in claim 11 which includes software that transmits paging system and zone specifics, as selected on a screen, to at least one of the paging systems via the computer network for presentation of selected verbal messages in the selected zone.

* * * * *